May 7, 1968  M. J. LOEHLE  3,381,518
AERATION METER
Filed July 30, 1965  2 Sheets-Sheet 1
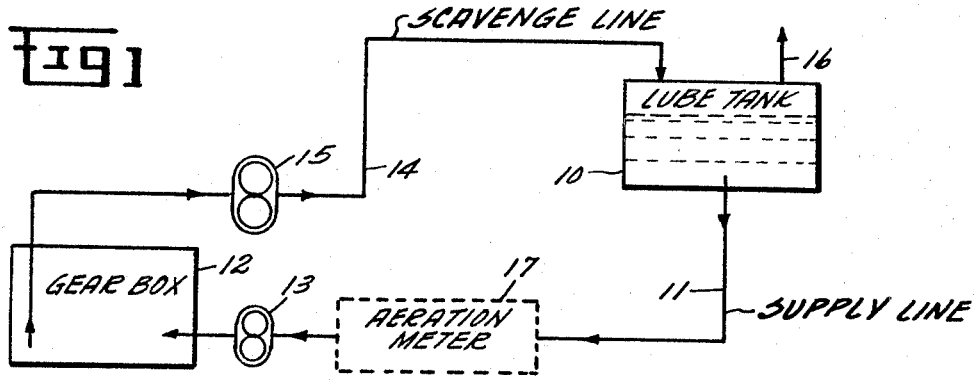
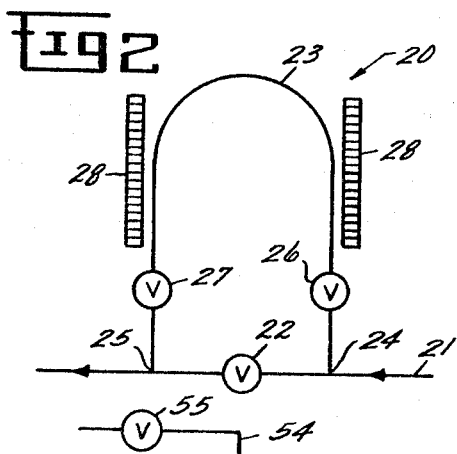
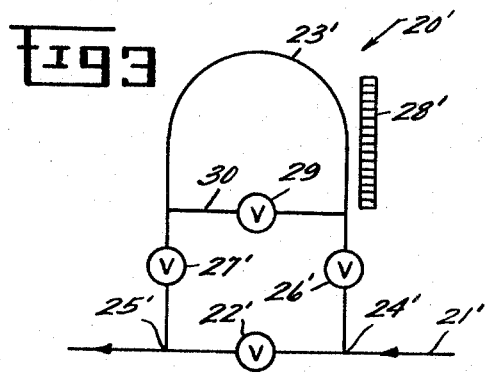
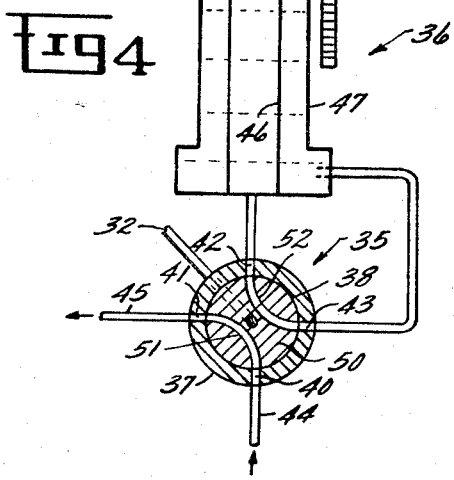
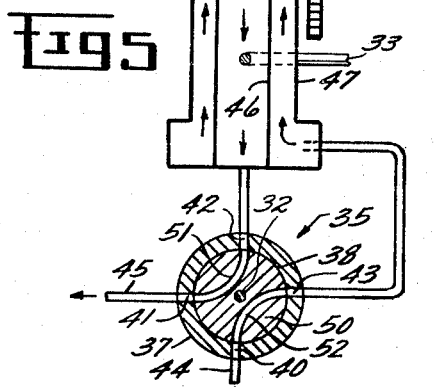
INVENTOR.
MAX J. LOEHLE
BY
George R. Powers
ATTORNEY May 7, 1968  M. J. LOEHLE  3,381,518
AERATION METER
Filed July 30, 1965  2 Sheets-Sheet 2
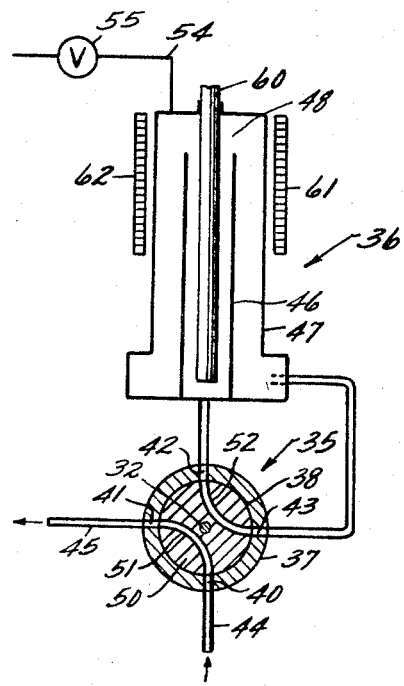
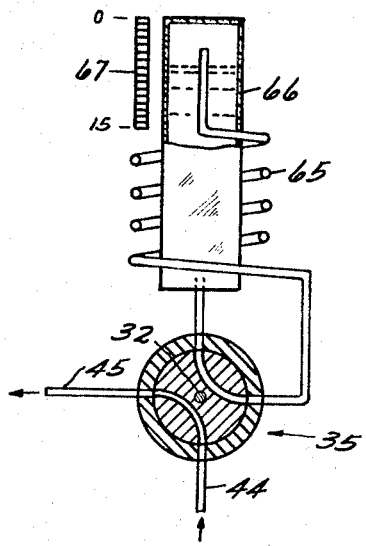
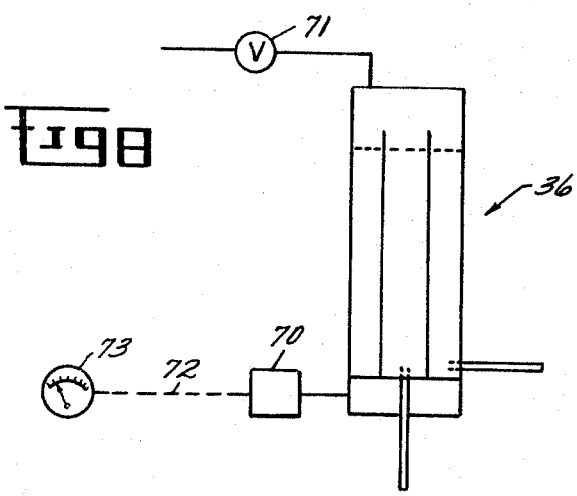
INVENTOR.
MAX J. LOEHLE
BY
George R. Powers
ATTORNEY

United States Patent Office 3,381,518
Patented May 7, 1968

3,381,518
AERATION METER
Max J. Loehle, Lynn, Mass., assignor to General Electric Company, a corporation of New York
Filed July 30, 1965, Ser. No. 476,118
8 Claims. (Cl. 73—19)

ABSTRACT OF THE DISCLOSURE

An aeration meter which traps a sample of flowing liquid and then permits gravitational separation of the gaseous and liquid constituents of said sample, wherein the percent of entrained gas by volume is capable of being detected and easily read on a gauge.

---

This invention relates to metering apparatus for measuring the amount of gas entrained in a liquid medium and, more particularly, to an aeration meter for measuring the amount of air entrained in a lubricating fluid.

In gas turbine powerplants, its is essential that certain components, including engine bearings and gearbox assemblies, be supplied continuously with lubricating fluid. In typical lubrication systems for such powerplants, positive displacement pumps are used for supplying the lubricants to the lubricated parts and for returning the fluid to the storage tank. To prevent excessive build-up of lubricant in the sumps during powerplant operation, the scavenge or return pump generally has somewhat greater capacity than the supply or lube pump. When, however, the full capacity of the scavenge pump is not required for pumping lubricant, a certain amount of air is pumped to the storage tank along with the lubricant. In addition, the lubricant may pick up quantities of air during the lubricating process due to turbulence, etc., in the flowing liquid. Consequently, the lubricant which is returned to the storage tank may have a substantial quantity of air entrained therein, the entrained air being free gas and not gas dissolved in the liquid. If this air is not removed from the lubricant before it is recirculated through the lube pump and again supplied to the lubricated elements, the amount of lubricant supplied will be substantially reduced since the positive displacement lube pump has a fixed capacity at any particular speed. When air is entrained in the lubricant, a portion of the pump capacity is thus utilized in pumping air rather than the lubricating fluid. To assure an adequate supply of lubricant to the bearings and other lubricated elements at all times, it is necessary that the amount of air entrained in the fluid be maintained at a low level. This is particularly essential in aircraft gas turbine powerplants which are operated at relatively high altitudes. At such altitudes, a relatively small amount of entrained air can cause severe lubrication problems since the volume of the air and, therefore, the pump capacity utilized in pumping the air is inversely proportional to the pressure (Boyle's law).

In view of the foregoing, it is not surprising that many arrangements have been proposed and used for deaerating the lubricant in the supply tank. In the past, however, it has been rather difficult to evaluate such arrangements since there has been no simple and effective way of measuring the amount and, more importantly, the volume of air entrained in the lubricant supplied to the lube pump. In other words, there has been no straightforward and effective quantitative method of indicating the deaeration performance of the lubrication system.

It is therefore an object of this invention to provide simple and effective means for measuring the amount of gas entrained in a liquid.

Another object of this invention is to provide means for measuring the relative volumes of gaseous and liquid constituents comprising a liquid medium.

Yet another object is to provide improved means for measuring the relative amounts of gaseous and liquid constituents comprising a moving stream of liquid medium.

A further object is to provide improved means for measuring at different pressures the relative volumetric amounts of gas entrained in a flowing liquid medium.

A still further object is to provide simple and effective means for indicating the deaeration performance of a lubrication system.

It is yet another object of this invention to provide improved metering apparatus for measuring the amount of air or gas entrained at various pressures in the lubricant supplied to the lubricated elements of a gas turbine powerplant.

Briefly stated, in carrying out the invention in one form, a metering apparatus for measuring the amount of gas entrained in a liquid medium, such as air entrained in a lubricating fluid, includes first conduit means having first valve means therein. A second conduit means is connected at its opposite ends to the first conduit means upstream and downstream of the first valve means so as to provide an alternate passage around the first valve means, second and third valve means being provided in the second conduit means. The valve means are operated in unison by control means which simultaneously closes the first valve means and opens the second and third valve means to direct the entire flow of liquid medium through the second conduit means. The control means also simultaneously opens the first valve means and closes the second and third valve means to trap a sample of the liquid medium in the second conduit means between the second and third valve means and to thereafter direct the entire flow of liquid medium through the first valve means. When a sample of the liquid medium is trapped therein, the second conduit means is disposed such that various portions have different elevations so as to permit gravitational separation of the gaseous and liquid constituents comprising the sample. After the constituents have separated, their relative volumes can be easily measured since the second conduit means has a known volume between the second and third valve means.

By a further aspect of the invention, the second conduit means intermediate the second and third valve means has parallel passageways within one of which is located a fourth valve means which is opened and closed in unison with the first valve means. By a still further aspect of the invention, the four valve means may take different forms and may be combined into a single selector valve assembly. Also, in accordance with such an arrangement, certain portions of the first and second conduit means may be formed integrally with the valve assembly.

While the invention is distinctly claimed and particularly pointed out in the claims appended hereto, the invention will be better understood and appreciated, along with other objects and advantages thereof, from the following detailed description when considered in connection with the accompanying drawings, in which:

FIG. 1 is a schematic view of a lubrication system including the metering apparatus of this invention;

FIG. 2 is a schematic view of a simplified metering apparatus formed in accordance with the present invention;

FIG. 3 is a schematic view similar to FIG. 2 illustrating a slightly modified arrangement;

FIG. 4 is a view of an aeration meter utilizing a four way selector valve, the selector valve member being located in the measuring or reading position;

FIG. 5 is a view similar to FIG. 4 showing the selector valve member in the sampling position;

FIG. 6 is a view of a metering arrangement particularly suited for use over a broad range of fluid flow rates;

FIG. 7 is a view of an aeration meter having a compact arrangement of elements; and FIG. 8 is a view of an aeration meter designed for remote reading.

The metering apparatus of this invention will be best understood when considered in connection with a lubrication system in which it has particular utility. Therefore, with reference to FIG. 1, a lubrication system of a type commonly used in gas turbine powerplants for aircraft propulsion is schematically illustrated. The lubrication system includes a lube tank 10 from which lubricant is pumped through a supply line 11 to an engine gearbox 12 by a positive displacement pump 13. After the gears and the gearbox bearings have been lubricated, the lubricant collects in a gearbox sump from which it is pumped through a return line 14 to the lube tank 10 by a scavenge pump 15 which is, as the lube or supply pump 13, a positive displacement pump. As indicated previously, the scavenge pump 15 has somewhat greater capacity than the lube pump 13 so as to prevent excessive build-up of lubricant in the gearbox sump, any excess capacity pumping air which is continuously admitted to the gearbox by suitable venting means. As also indicated previously, the lube tank 10 desirably includes means for removing entrained air from the lubricant and discharging the extracted air through a vent 16 which may, if desired, lead back to the gearbox 12. While the means employed in the lube tank 10 for deaerating the lubricant may take on different forms, it is essential that the means be effective. It is therefore extremely important that a suitable testing device be available for evaluating the effectiveness of various deaerating arrangements. In accordance with the present invention, an aeration meter 17 is connected to the supply line 11 intermediate the lube tank 10 and the lube pump 13 for accurately sampling the flow of lubricant and for indicating the relative volumes of lubricant and entrained air at any operating pressure. This information provides a direct indication of the effectiveness of the deaerating apparatus.

A simplified metering apparatus 20 formed in accordance with the present invention is illustrated by FIG. 2. The metering apparatus 20 includes a supply conduit 21 (comparable to the supply line 11 of FIG. 1) having a first valve 22 therein, the valve 22 having an open position for permitting flow of a liquid medium such as lubricating fluid and a closed position for preventing flow. When the valve 22 is in its open position, the liquid flows through the supply conduit 21 and the valve 22 from right to left as indicated by arrows on FIG. 2. A second or bypass conduit 23 has its upstream end connected to the upstream section of the supply conduit at 24 and its downstream end connected to the downstream section of the supply conduit at 25. Second and third valves 26 and 27, respectively, are located in the bypass conduit 23 adjacent the upstream and downstream ends, respectively. These valves 26 and 27, as the first valve 22, have open and closed positions, and control means is provided for operating the three valves in unison. More particularly, the valves 26 and 27 are closed when the valve 22 is open, and vice versa.

The operation of the metering apparatus 20 will now be described. When the first valve 22 is open and the valves 26 and 27 are closed, the lubricant or other liquid medium may flow directly through the supply conduit 21 and the valve 22 without being obstructed. When it is desired to determine the amount of air entrained in the liquid, however, the valve 22 is closed and the valves 26 and 27 are simultaneously opened. The entire stream of lubricant then flows from the upstream section of the supply conduit 21 through the bypass conduit 23 to the downstream section of the supply conduit 21. By again closing the second and third valves 26 and 27 and opening the first valve 22, a sample quantity of the lubricant will be trapped in the bypass conduit 23. With the inverted U-shaped portion of the conduit 23 between the valves 26 and 27 being disposed in a vertical plane, gravity will cause separation of the liquid and air comprising the trapped sample. If the conduit 23 is made of a transparent material such as glass, it is then an easy matter to read by means of suitable scales 28 the relative volumes of liquid and air in the sample. It is of course necessary in this simplified embodiment of the invention to determine the amount of liquid in each leg of the inverted U-shaped portion of the conduit 23 since the amounts may not be the same; an arrangement providing a more direct reading is illustrated by FIG. 3.

As shown by FIG. 3, a preferred form of the invention has a valve 29 in a passageway 30 which is one of two parallel passageways 23' and 30 interconnecting valves 26' and 27', primed numerals indicating elements identical in every respect to those described above in connection with FIG. 2. The valve 29 is operated in unison with the other valves, and its setting is at all times identical with that of valve 22'. Thus, when a sample of the liquid medium is trapped between the valves 26' and 27', the valve 29 is in its open position so that a closed hydraulic circuit is formed by the passageways 23' and 30. In this manner, the liquid level in both legs of the passageway 23' will be identical, and only a single reading from scale 28' is required in order to determine the amount by volume of entrained air.

By FIGS. 4 and 5, the invention is illustrated in a form especially suited for use in practice. In particular, the four valves of FIG. 3 have been replaced by a single selector valve assembly 35 and the inverted U-shaped passageway has been replaced by a concentric glass tube arrangement 36. Thus, while the appearance of the arrangement has changed rather substantially from that of FIG. 3, the mode of operation has not changed. With reference now to FIGS. 4 and 5, a valve housing 37 has a cylindrical cavity 38 therein, and the cavity 38 has first, second, third and fourth ports 40, 41, 42 and 43, respectively, uniformly spaced about its wall. An upstream section 44 of a supply conduit communicates with the first port 40, and the downstream section 45 of the supply conduit communicates with the second port 41. In a similar manner, the third port 42 is in fluid communication with the interior tube 46 of the arrangement 36 and the fourth port 43 is in communication with the outer glass tube 47, the tubes 46 and 47 communicating at their upper ends at 48. A cylinder 50 having a pair of passages 51 and 52 therein is located in the cavity 38 and is movable between a first operative position illustrated by FIG. 4 and a second operative position illustrated by FIG. 5. In the first operative position, the passage 51 connects the first port 40 and the second port 41 to permit unimpeded flow of the lubricant from the upstream section 44 to the downstream section 45 of the supply conduit.

At the same time, the passage 52 provides communication between the third and fourth ports 42 and 43 and the inner and outer tubes 46 and 47; in other words the passage 52 forms with the tubes 46 and 47 a closed hydraulic circuit. When it is desired to take a fresh sample of the liquid medium, the cylinder 50 is moved by suitable control means 32, such as a handle or solenoid actuator operated by the person conducting the aeration tests, to the second operative position of FIG. 5 in which the passage 51 interconnects the ports 41 and 42 and the passage 52 interconnects the ports 43 and 40. In this second operative position, the liquid medium flows from the upstream section 44 of the supply conduit through the tubes 46 and 47 to the downstream section 45. By then turning the cylinder 50 back to the first operative position of FIG. 4, a sample of the liquid is trapped between the third and fourth ports 42 and 43 in the tubes 46 and 47. It will be obvious to those skilled in the art that forms of selector valves other than cylindrical arrangements could be used in the practice of this invention. For example, face ported valve means could be used.

After a suitable interval of time, the liquid and gaseous constituents separate under the influence of gravity and the relative volume of air may be easily read on a suitable scale 53. However, if either the fluid is very viscous or the entrained air bubbles are very small, it may take an excessively long time for all the air to separate out at the top. It has been found that the rate at which separation occurs can be accelerated by varying the pressure in the tubes 46 and 47. A pressure line 54 and a valve 55 are provided for this purpose. More particularly, if the system pressure is above atmospheric, opening the valve 55 to atmosphere will reduce the pressure on entrained air bubbles and permit them to expand and separate out at a much faster rate. If the system pressure is below atmospheric, opening the valve 55 to atmosphere will increase the pressure on any entrained bubbles and thereby decrease their size. As a result, the liquid level will drop immediately to a level very close to its final level. If the system pressure is near atmospheric, it has been found that rapid separation can be effected by first subjecting the liquid to a vacuum and then restoring atmospheric pressure. It will, of course, occur to those skilled in the art that this procedure will not effect the final reading since the liquid is virtually incompressible.

A metering apparatus which is sized for a particular flow capacity may not give entirely true readings at lower flow rates, the reason being that the air bubbles (especially if they are large) may not be swept along fast enough to overcome their natural buoyancy in the inner, or downcoming, tube 46. As a result, separation will partially occur during sampling and the indicated volume of air will be greater than the actual relative volume. One way to attack this problem is to position the concentric tubes 46 and 47 in a horizontal plane during sampling and to then move the tubes into an upright position for reading by suitable moving means 33, such as a handle or solenoid actuator operated by the person conducting the aeration tests. This approach is also desirable for eliminating slight errors in readings caused by pressure variations due to differences in elevation during sampling. However, if this approach is impractical, the metering apparatus may be modified as illustrated by FIG. 6. The arrangement of FIG. 6 is substantially identical to that of FIGS. 4 and 5 except that a solid rod 60 is inserted into the inner tube 46 to decrease the cross sectional flow area and thereby increase flow velocity during a low-flow condition. For a high-flow condition, the rod 60 may be withdrawn. Since the enclosed volumes between the ports 42 and 43 are different at the two rod settings, two scales are 61 and 62 are necessary, scale 61 being used during normal high-flow conditions and scale 62 being used during low-flow conditions.

It is sometimes desirable, especially during flight testing of an aircraft gas turbine powerplant, that the metering apparatus be as compact as possible. An obvious way of making the metering apparatus compact would be to shorten the concentric tubes; this is not, however, an altogether satisfactory approach since the greater the trapped volume, the more accurate and representative the readings. A way of making a compact arrangement without sacrificing volume is illustrated by FIG. 7. In accordance with FIG. 7, the lower port of the inner tube 65 is formed in a coil such that the desired volume is provided in a minimum height. This arrangement is possible since in practice it has been found that the amount of entrained air rarely exceeds 15 percent by volume; accordingly, only about the upper 15 percent of the scale 67 is needed.

The arrangements described above require visual sighting of the tubes in which separation occurs by the test operator. Under some circumstances, such as during flight tests where the metering apparatus may be installed in an inaccessable position, it may be desirable to provide remote indicating means. One such arrangement is illustrated by FIG. 8 in which a transducer 70 is used to measure the pressure, or static head, produced by the liquid after the air has separated out. To provide an accurate indication of the static head, the valve 71 is opened to atmospheric pressure when readings are taken. Once the static head, and therefore the height of the liquid column, is known, a suitably calibrated scale will directly indicate the percentages of air and liquid by volume. The pressure measured by the transducer 70 may, of course, be transmitted through suitable means 72 to a remote reading scale 73. Other remote reading arrangements will also occur to those skilled in the art. For example, a differential pressure measuring device such as a manometer may be used for indicating the height of the liquid column. Other arrangements will also be obvious to those skilled in the art.

While the metering apparatus of this invention has particular utility as an aeration meter in aircraft lube systems and has therefore been described in such a context, it will be obvious to those skilled in the art that the metering apparatus of this invention has broad applicability whenever it is desired to obtain information as to the relative volumes of gaseous and liquid constituents comprising a liquid medium.

It will thus be seen that the invention provides simple and effective means for measuring the percentage of gas by volume entrained in a flowing liquid medium. The metering apparatus is extremely accurate since it samples relatively large volumes of the entire flow and does not merely draw off a small portion of the flow. In addition, the metering apparatus has little or no effect on the system when samples are not being taken, and the apparatus is capable of taking extremely accurate readings at a wide range of system pressures.

While particular embodiments of this invention have been shown and described, it will be understood that various changes and modifications may be made without departing from the spirit and scope of the invention, and it is intended to cover all such equivalent changes and modifications by the appended claims.

What is claimed as new and is desired to secure by Letters Patent of the United States is:

1. In a lubrication system including a lube tank and a supply conduit for transmitting lubricant from the tank to the lubricated apparatus, means for measuring the amount of air entrained in the lubricant flowing through the supply conduit, said measuring means comprising:

a valve assembly including a valve housing having first, second, third, and fourth ports therein and a selector valve member having first and second operative positions, said selector valve in said first operative position interconnecting said first and second ports and interconnecting said third and fourth ports, and in said second operative position interconnecting said first and forth posts and interconnecting said second and third ports, an upstream section of the supply conduit communicating with said first port and a downstream section of the supply conduit communicating with said second port, a bypass conduit including a passageway connecting said third and fourth ports, control means for moving said selector valve member between said first and second operative positions, said selector valve member in said first operative position permitting lubricant to flow directly between said upstream and downstream sections of the supply conduit through said valve housing, and said selector valve member in said second operative position directing lubricant serially through said upstream section of the supply conduit, the passageway of said bypass conduit, and said downstream section of the supply conduit, movement of said selector valve member from said second operative position to said first operative position trapping a sample of the lubricant in a closed hydraulic circuit including the passageway of said bypass conduit, said closed hydraulic circuit being disposed when a sample of lubricant is trapped therein such that portions of said closed hydraulic circuit have different elevations to permit gravitational separation therein of the air entrained in the sample, and means for indicating after gravitational separation has occurred the volumetric amounts of air and lubricant, whereby the amount of air entrained in the lubricant is measured.

2. Metering apparatus for measuring the amount of gas entrained in a liquid medium, said metering apparatus comprising:

a valve assembly including a valve housing having first, second, third, and fourth ports therein and a selector valve member having first and second operative positions, said selector valve in said first operative position interconnecting said first and second ports and interconnecting said third and fourth ports, and in said second operative position interconnecting said first and fourth ports and interconnecting said second and third ports, first conduit means including an upstream section communicating with said first port and a downstream section communicating with said second port, second conduit means including a passageway connecting said third and fourth ports, control means for moving said selector valve member between said first and second operative positions, said selector valve member in said first operative position permitting a liquid medium in said first conduit means to flow directly between said upstream and downstream sections through said valve housing, and said selector valve member in said second operative position directing a liquid medium serially through said upstream section of said first conduit means, the passageway of said second conduit means, and said downstream section of said first conduit means, movement of said selector valve member from said second operative position to said first operative position trapping a sample of the liquid medium in a closed hydraulic circuit including the passageway of said second conduit means, said closed hydraulic circuit being disposed when a sample of liquid medium is trapped therein such that portions of said closed hydraulic circuit have different elevations to permit gravitational separation therein of the gaseous and liquid constituents comprising the sample, and means for indicating after gravitational separation has occurred the volumetric amounts of the gaseous and liquid constituents, whereby the amount of gas entrained in the liquid medium is measured.

3. Metering apparatus as defined by claim 2 including means for subjecting a sample of liquid medium in said closed hydraulic circuit to different pressures to accelerate gravitational separation.

4. Metering apparatus as defined by claim 2 in which the passageway of said second conduit means comprises:

an outer elongated tube having first and second ends, an inner tube coaxially mounted within said outer tube, means interconnecting the first ends of said tubes for fluid flow communication therebetween, and means connecting the second ends of said tubes to said third and fourth ports for direct fluid flow communication between said tubes through said valve housing when said selector valve member is in said first operative position.

5. Metering apparatus as defined by claim 4 including means for moving said outer and inner tubes between substantially horizontal and substantially vertical positions, said tubes being positioned vertically when separation of the gaseous and liquid constituents is desired.

6. Metering apparatus as defined by claim 4 including means for varying the cross-sectional area of said inner tube.

7. Metering apparatus as defined by claim 4 in which at least said outer tube is transparent to provide a visual indication of the volumetric amounts of the gaseous and liquid constituents.

8. Metering apparatus for measuring the amount of gas entrained in a liquid medium, said metering apparatus comprising:

a valve housing having a cylindrical cavity therein and first, second, third and fourth ports communicating with said cavity, a cylinder received in said cavity for movement therein between first and second operative positions, said cylinder having a pair of fluid flow passages therein, one of said passages connecting said first and second ports and the other of said passages connecting said third and fourth ports when said cylinder is in said first operative position, and one of said passages connecting said first and fourth ports and the other of said passages connecting said second and third ports when said cylinder is in said second operative position, first conduit means including an upstream section communicating with said first port and a downstream section communicating with said second port, second conduit means including a passageway connecting said third and fourth ports, control means for moving said cylinder between said first and second operative positions, said cylinder in said first operative position permitting a liquid medium in said first conduit means to flow directly between said upstream and downstream sections through the passage in said cylinder connecting said first and second ports, and said cylinder in said second operative position permitting a liquid medium to flow serially through said upstream section of said first conduit means, the passage in said cylinder connecting said first and fourth ports, the passageway of said second conduit means, the passage in said cylinder connecting said second and third ports, and said downstream section of said first conduit means, movement of said cylinder from said second operative position to said first operative position trapping a sample of the liquid medium in a closed hydraulic circuit formed by the passageway of said second conduit means and the passage in said cylinder connecting said third and fourth posts, said closed hydraulic circuit being disposed when a sample of liquid medium is trapped therein such that portions of said closed hydraulic circuit have different elevations to permit gravitational separation therein of the gaseous and liquid constituents comprising the sample, and means for indicating after gravitational separation has occurred the volumetric amounts of the gaseous and liquid constituents, whereby the amount of gas entrained in the liquid medium is measured.

References Cited

UNITED STATES PATENTS

| | | | |
|---|---|---|---|
| 2,741,911 | 4/1956 | Fitzpatrick et al. | 73—19 |
| 2,882,724 | 4/1959 | Smith | 73—200 |
| 2,987,912 | 6/1961 | Jacobson | 73—19 |
| 3,044,236 | 7/1962 | Bearden et al. | 55—270 |

RICHARD C. QUEISSER, *Primary Examiner.*

C. I. McCLELLAND, *Assistant Examiner.*